United States Patent
Sun et al.

(10) Patent No.: US 10,728,925 B2
(45) Date of Patent: Jul. 28, 2020

(54) EXTENDED GRANT FOR ENHANCED COMPONENT CARRIER

(71) Applicant: QUALCOMM Incorporated, San Diego, CA (US)

(72) Inventors: Jing Sun, San Diego, CA (US); Taesang Yoo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/051,074

(22) Filed: Jul. 31, 2018

(65) Prior Publication Data

US 2018/0338322 A1     Nov. 22, 2018

Related U.S. Application Data

(62) Division of application No. 15/280,660, filed on Sep. 29, 2016, now Pat. No. 10,057,921.

(Continued)

(51) Int. Cl.
*H04W 72/14*     (2009.01)
*H04L 5/00*     (2006.01)
(Continued)

(52) U.S. Cl.
CPC .......... *H04W 72/14* (2013.01); *H04L 5/0055* (2013.01); *H04W 72/042* (2013.01); *H04W 72/0446* (2013.01); *H04L 1/1812* (2013.01)

(58) Field of Classification Search
None
See application file for complete search history.

(56) References Cited

U.S. PATENT DOCUMENTS

2002/0110095 A1*   8/2002   Jiang .................. H04W 12/001
                                                       370/328
2012/0026985 A1*   2/2012   Ren ...................... H04L 1/0025
                                                       370/336

(Continued)

FOREIGN PATENT DOCUMENTS

WO     2009022309 A2     2/2009
WO     2013184487 A2     12/2013
WO     2014098701 A1     6/2014

OTHER PUBLICATIONS

International Search Report and Written Opinion—PCT/US2016/054944—ISA/EPO—dated Mar. 22, 2017.

(Continued)

*Primary Examiner* — Rebecca E Song
(74) *Attorney, Agent, or Firm* — Arent Fox LLP

(57) ABSTRACT

A method, an apparatus, and a computer-readable medium for wireless communication are provided. The apparatus may be a base station. The apparatus may transmit a first grant to a UE. The apparatus may determine whether an acknowledgment to the first grant is received. When the acknowledgment to the first grant fails to be received by the apparatus, the apparatus may transmit, to the UE, a second grant including information regarding the first grant. In another aspect, an apparatus may be a UE. The apparatus may receive a first grant. The first grant may include a first Mayday bit. The apparatus may receive a second grant. The second grant may include a TTI count corresponding to a number of unacknowledged TTIs. The second grant may further include a second Mayday bit. The apparatus may determine an acknowledgment based on the TTI count and the first and second Mayday bits.

28 Claims, 13 Drawing Sheets

Related U.S. Application Data

(60) Provisional application No. 62/250,429, filed on Nov. 3, 2015.

(51) Int. Cl.
*H04W 72/04* (2009.01)
*H04L 1/18* (2006.01)

(56) References Cited

U.S. PATENT DOCUMENTS

| | | | |
|---|---|---|---|
| 2014/0177487 A1* | 6/2014 | Hammarwall | H04W 72/042 370/280 |
| 2014/0204893 A1 | 7/2014 | Horiuchi et al. | |
| 2015/0036476 A1* | 2/2015 | Vos | H04W 72/1278 370/216 |
| 2015/0305058 A1 | 10/2015 | Hammarwall et al. | |
| 2016/0226690 A1* | 8/2016 | Hessler | H04L 1/0032 |
| 2016/0337867 A1 | 11/2016 | Uchino et al. | |
| 2017/0127442 A1 | 5/2017 | Sun et al. | |

OTHER PUBLICATIONS

Partial International Search Report—PCT/US2016/054944—ISA/EPO—dated Dec. 22, 2016.

* cited by examiner

EXTENDED GRANT FOR ENHANCED
COMPONENT CARRIER

CROSS-REFERENCE TO RELATED
APPLICATION(S)

The application is a divisional application of U.S. patent application Ser. No. 15/280,660, entitled "EXTENDED GRANT FOR ENHANCED COMPONENT CARRIER" and filed on Sep. 29, 2016, which claims the benefit of U.S. Provisional Application Ser. No. 62/250,429, entitled "EXTENDED GRANT FOR ENHANCED COMPONENT CARRIER" and filed on Nov. 3, 2015, the entire contents of both of which are expressly incorporated by reference herein in its entirety.

BACKGROUND

Field

The present disclosure relates generally to communication systems, and more particularly, to an extended downlink grant in a wireless communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication are provided. The apparatus may be a base station. The apparatus may transmit a first grant to a UE. The first grant may assign resources within a first set of Transmission Time Intervals (TTIs) to the UE. The apparatus may determine whether an acknowledgment to the first grant is received. When the acknowledgment to the first grant fails to be received by the apparatus, the apparatus may transmit a second grant including information regarding the first grant to the UE. The second grant may assign resources within a second set of TTIs to the UE.

In another aspect of the disclosure, a method, a computer-readable medium, and an apparatus for wireless communication are provided. The apparatus may be a UE. The apparatus may receive a first grant assigning resources within a first set of TTIs. The first grant may include a first Mayday bit. The apparatus may receive a second grant assigning resources within a second set of TTIs. For each TTI of the second set of TTIs, the second grant may include a TTI count corresponding to a number of unacknowledged TTIs before the TTI. The second grant may further include a second Mayday bit. The apparatus may determine an acknowledgment based on the TTI count and the first and second Mayday bits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
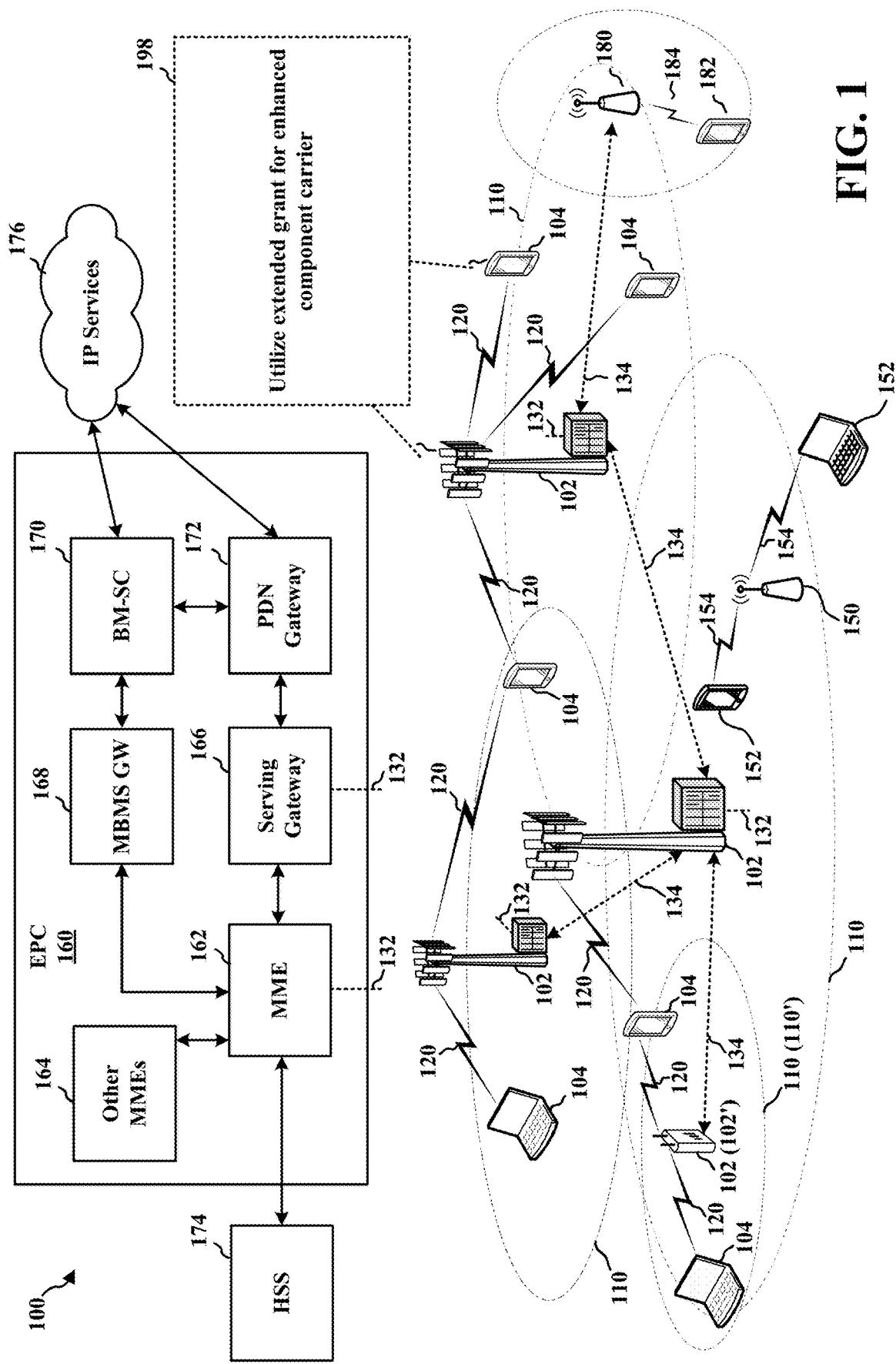
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to utilize (198) extended grant for enhanced component carrier. The details of the operations performed at 198 will be described below with reference to FIGS. 2-13.

Figures 2A, 2B, 2C, 2D:
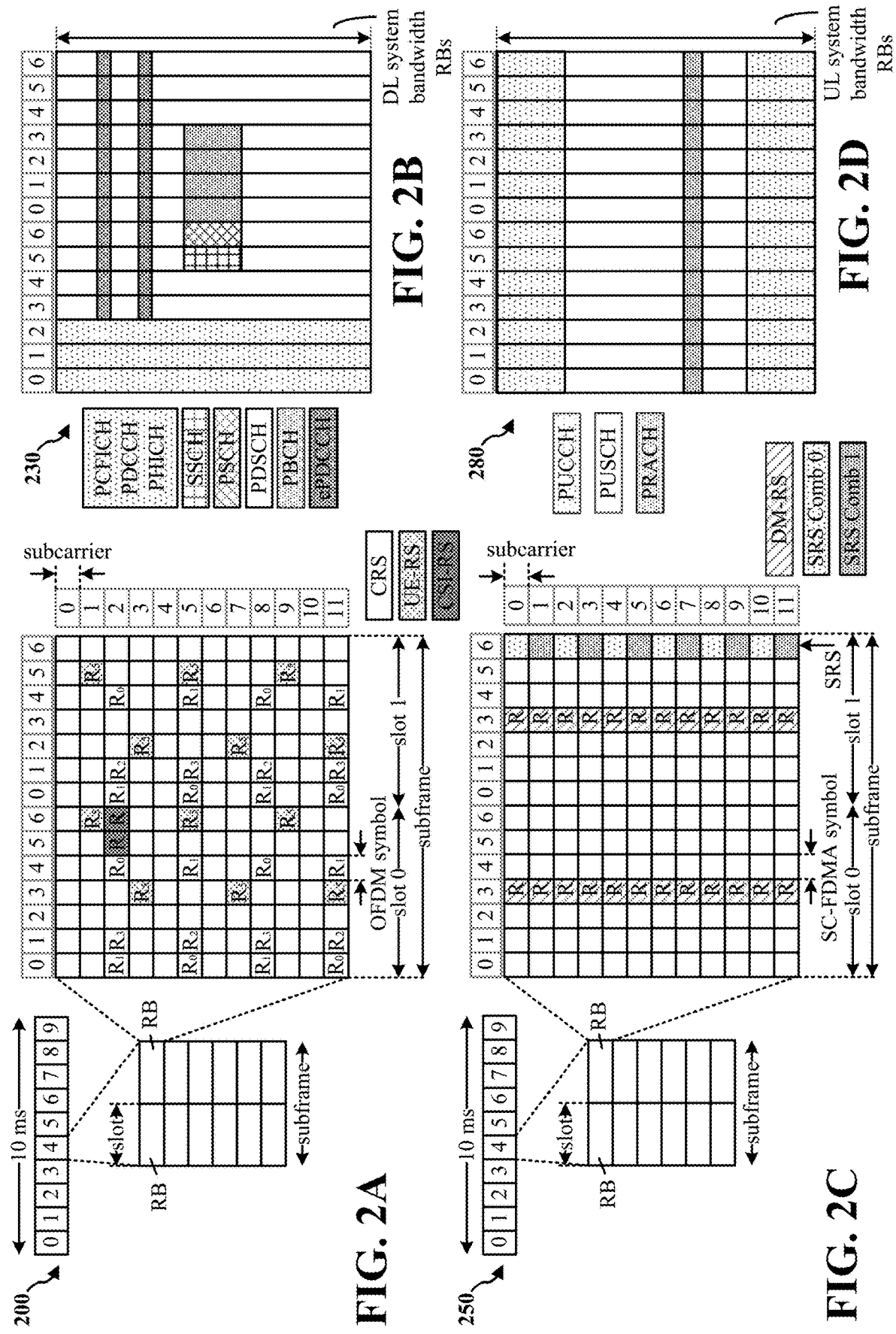
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
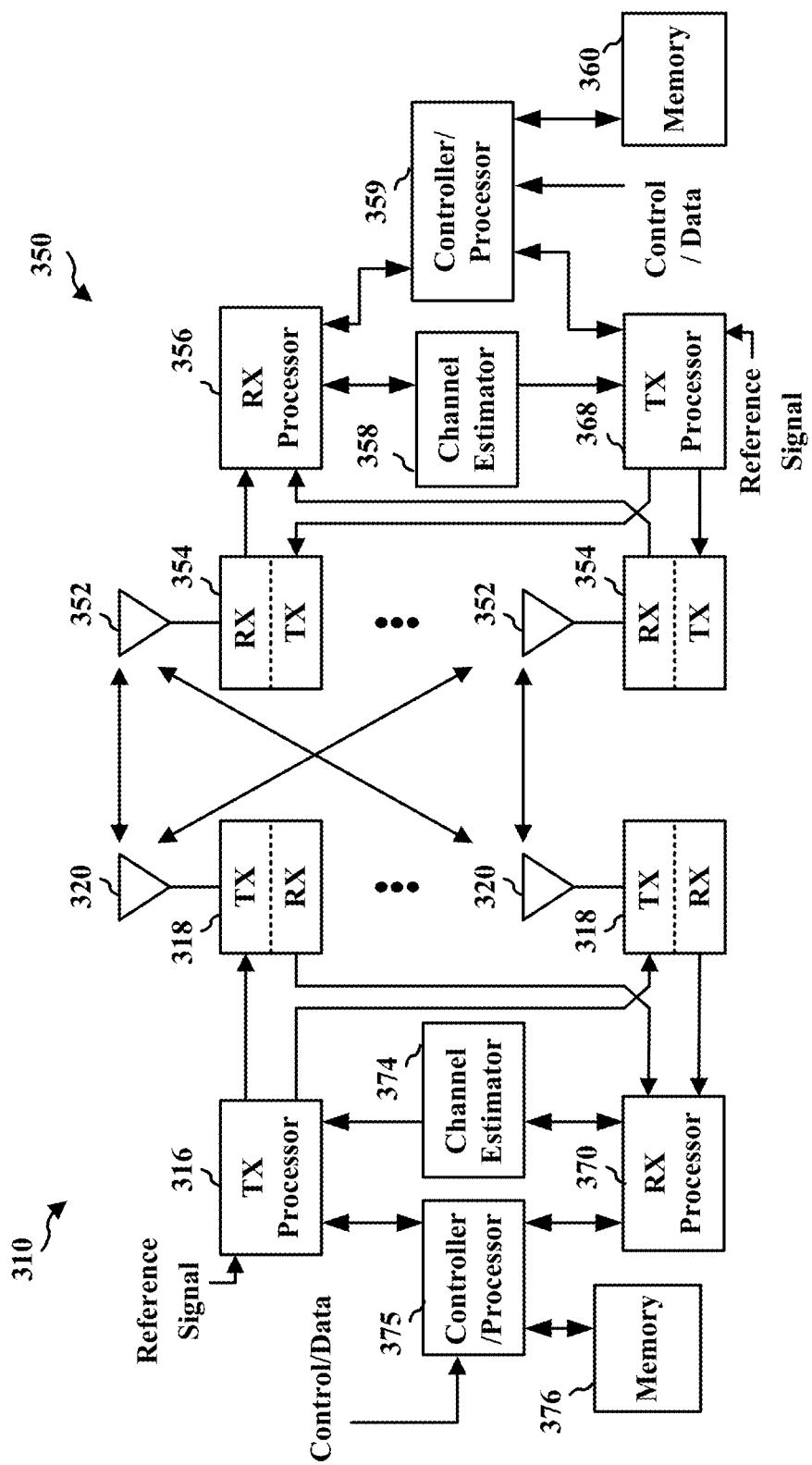
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Transmission Time Interval (TTI) is a parameter in digital telecommunication networks related to encapsulation of data from higher layers into frames for transmission on the radio link layer. TTI may refer to the duration of a transmission on the radio link. The TTI may be related to the size of the data blocks passed from the higher network layers to the radio link layer. To combat errors due to fading and interference on the radio link, data may be divided at the transmitter into blocks and then the bits within a block are encoded and interleaved. The length of time that may be required to transmit one such block may determine the TTI. At the receiver, all bits from a given block may need to be received before they can be deinterleaved and decoded. Having decoded the bits, the receiver can estimate the bit error rate (BER). The shortest decodable transmission may be one TTI. And the shortest period over which BER can be estimated may also be one TTI.

Transport block may be the payload for the physical layer (e.g., for the shared physical channel such as PDSCH and PUSCH). The size of the transport block may be determined based on the amount of data available, the modulation scheme possible based on the reported CQI, and the number of resource blocks available. A transport block may be divided into smaller size code blocks, which may be referred as code block segmentation, before being applied to the channel coding or rate matching modules in the physical layer. The size of a code block may be determined based on block sizes supported by the turbo interleaver module of encoder.

For Enhanced Component Carrier (eCC) PDSCH transmission, transport block group (TBG) based transmission may be performed with code block (CB) level ACK/NACK to multi-TTI (Transmission Time Interval) grant, which grants multiple TTIs to the same UE (e.g., for uplink transmission). For unlicensed band operation, it may be possible that the UE fails Clear Channel Assessment (CCA) so cannot send ACK or NACK, or the UE's ACK/NACK is transmitted, but due to a signal jammer, the ACK/NACK is not received at the eNB. When this happens, the wireless network may put the transmission on hold and trigger an ACK/NACK retransmission, which may result in delay and a time gap in the operation. Alternatively, the eNB may abandon the previous transmission and issue a new grant, potentially wasting resources. Alternatively, the wireless network may switch to a different HARQ process and trigger ACK/NACK retransmission at the same time. By switching to a different HARQ process and triggering ACK/NACK retransmission at the same time, delay or time gap in the operation may be avoided and no resource may be wasted, however, at the cost of supporting multiple HARQ processes (e.g., signaling for multiple HARQ processes, etc.).

In one aspect, when an ACK/NACK is not received when it is expected, the grant may be lost. In the case that the grant is lost, the UE may not attempt to decode and no ACK/NACK may be transmitted by the UE. In another aspect, when an ACK/NACK is not received when it is expected, the grant may be received by the UE correctly, but the UE may fail CCA, thus the ACK/NACK cannot be transmitted. In yet another aspect, when an ACK/NACK is not received when it is expected, the grant may be received by the UE correctly, the UE may have passed the CCA and transmitted the ACK/NACK, but the eNB cannot decode the ACK/NACK. This may be due to a signal jammer, or certain PUCCH resource collisions.

In one configuration, when the ACK/NACK to a previous grant is not received when it is expected, rather than putting the transmission on hold or abandoning the previous transmission, the eNB may continue to serve new data to the UE, without using another HARQ process. In such a configuration, the eNB may issue an extended grant to extend the previous grant to transmit more new data to the UE. The same (and may be only) HARQ process may be used in such a configuration. In one configuration, the extended grant may contain information regarding the previous grant with minimal or limited cost.

A multi-TTI grant may assign resources within multiple TTIs to the same UE (e.g., for uplink transmission). The resources assigned by a multi-TTI grant may be time-frequency resource elements. In one configuration, each TTI within a multi-TTI grant may be configured by the same set of parameters. For example, each TTI within a multi-TTI grant may have the same rank, the same modulation and coding (MCS) scheme, and the same number of resource elements, etc. In one configuration, the same grant may be transmitted in each TTI (e.g., re-iterated in each TTI), with a before/after field that indicates how many TTIs before and after this TTI are granted. As a result, missing some of the re-iterations of the grant may not completely waste the resources transmitted. For example, when one iteration of the grant is received, all TTIs after that may be decoded.

A multi-TTI grant is a data structure for an eNB to assign resources within one or more TTIs to a UE. For example, a multi-TTI grant may assign downlink resources within a set of TTIs to a UE so that the UE may receive data from the eNB through the assigned downlink resources during the set of TTIs. Once a UE receives a multi-TTI grant from an eNB, the UE may send an acknowledgment (e.g., ACK/NACK) back to the eNB to acknowledge the reception of the multi-TTI grant. In one configuration, a base grant may be defined as the first multi-TTI grant that the corresponding ACK/NACK is not received from the UE.

When the ACK/NACK corresponding to a transmitted multi-grant is not received, an extended grant may be generated and sent to the UE to transmit more new data to the UE. In one configuration, the extended grant may have the same parameters as the base grant. For example, a TTI within the extended grant may have the same rank, the same MCS scheme, and the same number of resource elements, etc. as a TTI within the base grant. Each multi-TTI grant may contain a Mayday bit. In one configuration, for two consecutive multi-TTI grants (e.g., first and second grants), Mayday bit of the second grant may be toggled if the ACK/NACK corresponding to the first grant is received, and Mayday bit of the second grant may not be toggled if the ACK/NACK corresponding to the first grant is not received.

In one configuration, the extended grant may include the number of TTIs in the base grant in the "before" field of the grant to indicate a continuation from the base grant. For example, the base grant has three TTIs, and the extended grant has another four TTIs. Then the first iteration of the extended grant may indicate that the extended grant has three TTIs before the current TTI and three TTIs after the current TTI.

Figure 4:
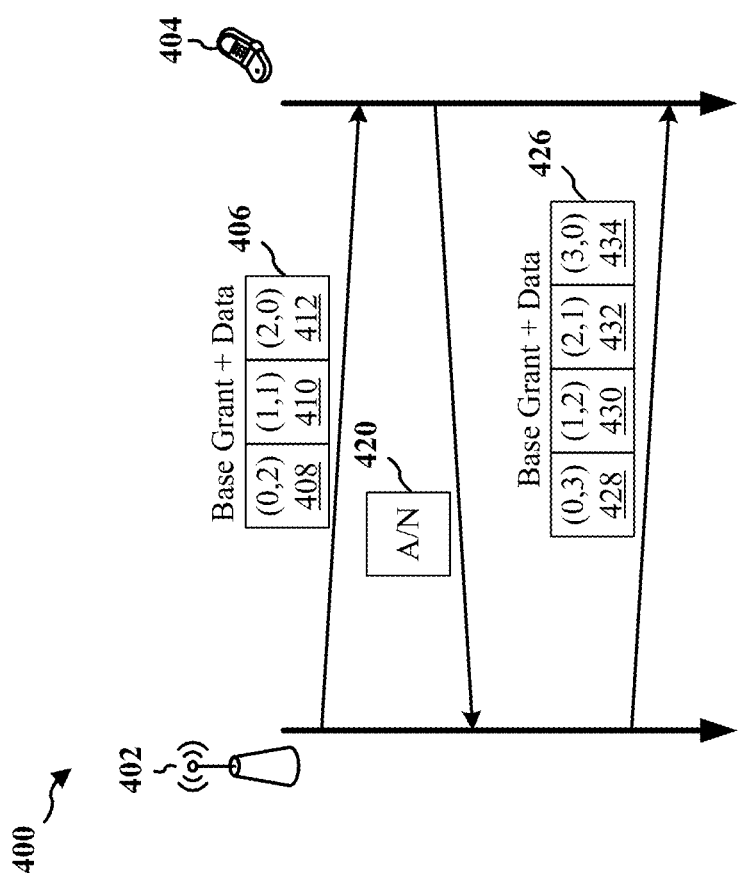
FIG. 4 is a diagram illustrating an example of normal operation of using multi-TTI grant for data transmission.

FIG. 4 is a diagram 400 illustrating an example of normal operation of using multi-TTI grant for data transmission. In this example, an eNB 402 may send a base grant 406 and corresponding data to a UE 404. The base grant 406 may have three TTIs 408, 410, and 412. The first iteration of the base grant 406 in the TTI 408 may contain a before/after value pair of (0, 2), which indicates that there are zero TTI before the TTI 408 and two TTIs after the TTI 408. The second iteration of the base grant 406 in the TTI 410 may contain a before/after value pair of (1, 1), which indicates that there are one TTI before the TTI 410 and one TTI after the TTI 410. The third iteration of the base grant 406 in the TTI 412 may contain a before/after value pair of (2, 0), which indicates that there are two TTIs before the TTI 412 and zero TTI after the TTI 412.

Upon successful receipt of the base grant 406 at the UE 404, the UE 404 may generate an acknowledgment (e.g., ACK/NACK 420) to the base grant 406, and send the ACK/NACK 420 to the eNB 402. The ACK/NACK 420 may contain an ACK or NACK for each CB in the TTIs 408, 410, and 412.

Upon successful receipt of the ACK/NACK 420 at the eNB 402, the eNB 402 may schedule another base grant 426 for the UE 404, and send the base grant 426 and corresponding data to the UE 404. The base grant 426 may have four TTIs 428, 430, 432, and 434. The first iteration of the base grant 426 in the TTI 428 may contain a before/after value pair of (0, 3), which indicates that there are zero TTI before the TTI 428 and three TTIs after the TTI 428. The second iteration of the base grant 426 in the TTI 430 may contain a before/after value pair of (1, 2), which indicates that there are one TTI before the TTI 430 and two TTIs after the TTI 430. The third iteration of the base grant 426 in the TTI 432 may contain a before/after value pair of (2, 1), which indicates that there are two TTIs before the TTI 432 and one TTI after the TTI 432. The fourth iteration of the base grant 426 in the TTI 434 may contain a before/after value pair of (3, 0), which indicates that there are three TTIs before the TTI 434 and zero TTI after the TTI 434.

In the example of FIG. 4, because the ACK/NACK 420 for the base grant 406 is successfully received at the eNB 402, a new base grant 426 is scheduled and transmitted. No extended grant is involved in this example. In one configuration, each of the base grants 406 and 426 contains a Mayday bit. In such a configuration, Mayday bits of the base grants 406 and 426 may be different (e.g., Mayday bit of the base grant 406 may be toggled to generate the Mayday bit of the base grant 426).

The UE 404 receives the base grant 426. Because Mayday bits of the base grants 406 and 426 are different and the before/after field of the base grant 426 indicates (e.g., by starting from zero at the "before" field) that the base grant 426 is not a continuation from the base grant 406, the UE 404 may realize that the grant 426 is a new base grant and the ACK/NACK 420 has been received by the eNB 402.

Figure 5:
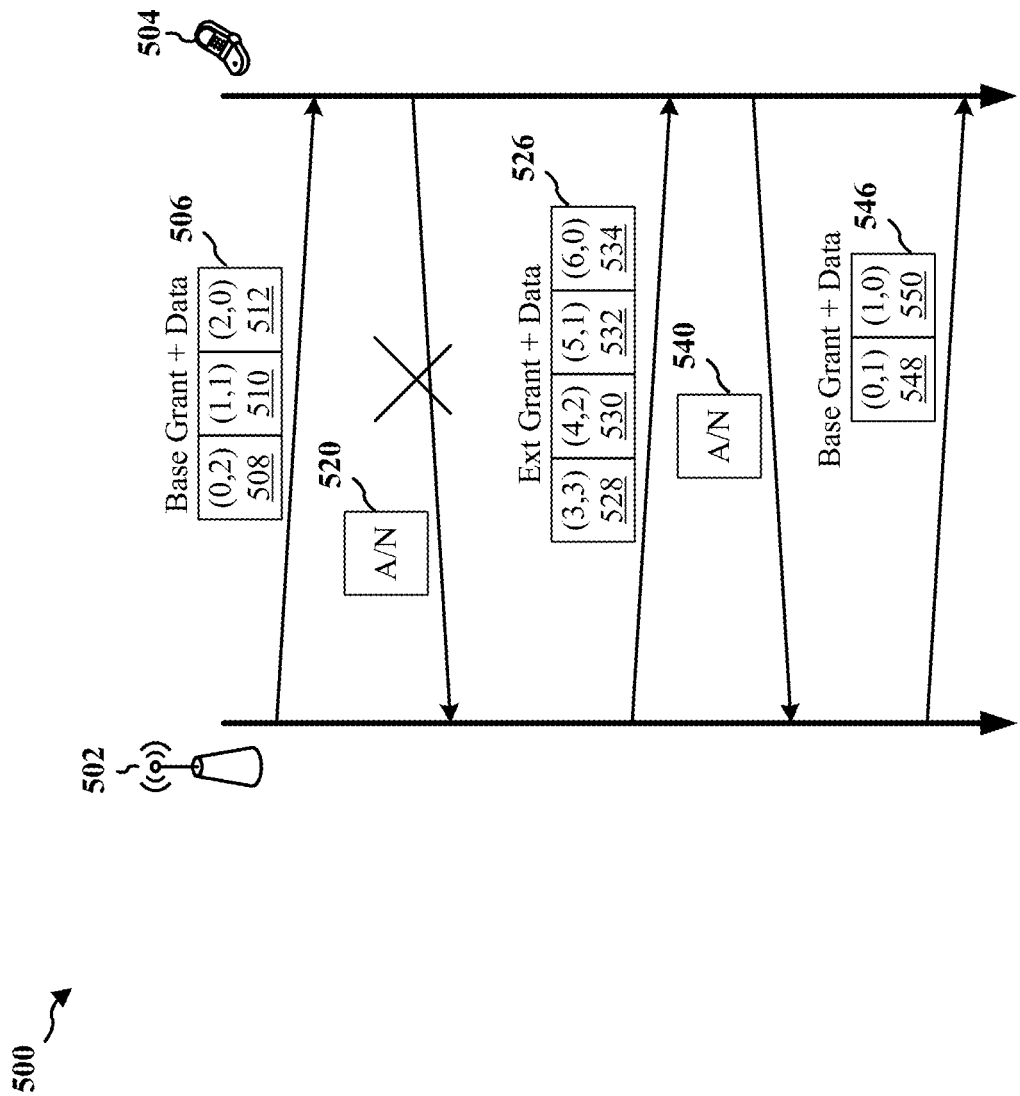
FIG. 5 is a diagram illustrating an example of using the extended grant for data transmission.

FIG. 5 is a diagram 500 illustrating an example of using the extended grant for data transmission. In this example, an eNB 502 may send a base grant 506 and corresponding data to a UE 504. The base grant 506 may have three TTIs 508, 510, and 512. The iterations of the base grant 506 in TTIs 508, 510, and 512 may contain before/after value pairs similar to those of the base grant 406 described above with reference to FIG. 4.

Upon successful receipt of the base grant 506 at the UE 504, the UE 504 may try to deliver an acknowledgment (e.g., ACK/NACK 520) to the eNB 502. The ACK/NACK 520 may contain an ACK or NACK for each CB in the TTIs 508, 510, and 512.

However, the eNB 502 may fail to receive the ACK/NACK 520. In one configuration, the eNB 502 may fail to receive the ACK/NACK 520 because the ACK/NACK 520 is not transmitted (e.g., due to CCA failure). In another configuration, the eNB 502 may fail to receive the ACK/NACK 520 because the ACK/NACK 520 fails to be decoded at the eNB 502 even though the ACK/NACK 520 is transmitted to the eNB 502.

Because the ACK/NACK 520 is not received, the eNB 502 may schedule an extended grant 526 for the UE 504, and send the extended grant 526 and corresponding data (e.g., new data) to the UE 504. The extended grant 526 may have four TTIs 528, 530, 532, and 534. Each iteration of the extended grant 526 may include the number of TTIs in the base grant 506 in the "before" field of the grant. For example, the first iteration of the extended grant 526 in the TTI 528 may contains before/after value pair of (3, 3), which indicates that there are three TTIs before the TTI 528 and three TTIs after the TTI 528. The second iteration of the extended grant 526 in the TTI 530 may contain a before/after value pair of (4, 2), which indicates that there are four TTIs before the TTI 530 and two TTIs after the TTI 530. The third iteration of the extended grant 526 in the TTI 532 may contain a before/after value pair of (5, 1), which indicates that there are five TTIs before the TTI 532 and one TTI after the TTI 532. The fourth iteration of the extended grant 526 in the TTI 534 may contain a before/after value pair of (6, 0), which indicates that there are six TTIs before the TTI 534 and zero TTI after the TTI 534.

In the example of FIG. 5, because the ACK/NACK 520 for the base grant 506 fails to be received at the eNB 502, the extended grant 526 may be scheduled and transmitted. In one configuration, each of the base grant 506 and the extended grant 526 may contain a Mayday bit. In such a configuration, Mayday bits of the base grant 506 and the extended grant 526 may be identical (e.g., not toggled).

The UE 504 may receive the extended grant 526. Because Mayday bits of the base grant 506 and the extended grant 526 are identical and the before/after field of the extended grant 526 indicates a continuation from the base grant 506 (e.g., by including the number of TTIs in the base grant 506 in the "before" field), the UE 504 may realize that the grant 526 is an extended grant and the ACK/NACK 520 fails to be received by the eNB 502. The UE 504 may generate an acknowledgment (e.g., ACK/NACK 540) to acknowledge both the base grant 506 and the extended grant 526, and sends the ACK/NACK 540 to the eNB 502. The ACK/NACK 540 may contain an ACK or NACK for each CB in the TTIs 508, 510, 512, 528, 530, 532, and 534.

Upon successful receipt of the ACK/NACK 540 at the eNB 502, the eNB 502 may schedule another base grant 546 for the UE 504, and send the base grant 546 and corresponding data to the UE 504. The base grant 546 may have two TTIs 548 and 550. The first iteration of the base grant 546 in the TTI 548 may contain a before/after value pair of (0, 1), which indicates that there are zero TTI before the TTI 548 and one TTI after the TTI 548. The second iteration of the base grant 546 in the TTI 550 may contain a before/after value pair of (1, 0), which indicates that there are one TTI before the TTI 550 and zero TTI after the TTI 550.

In the example of FIG. 5, because the ACK/NACK 540 covering the base grant 506 and the extended grant 526 is successfully received at the eNB 502, a new base grant 546 may be scheduled and transmitted. In one configuration, the base grant 546 may contain a Mayday bit. In such a configuration, Mayday bits of the extended grant 526 and the base grant 546 may be different (e.g., Mayday bit of the extended grant 526 is toggled to generate the Mayday bit of the base grant 546).

The UE 504 receives the base grant 546. Because Mayday bits of the extended grant 526 and the base grant 546 are different and the before/after field of the base grant 546 indicates (e.g., by starting from zero at the "before" field) that the base grant 546 is not a continuation from the extended grant 526, the UE 504 may realize that the grant 546 is a new base grant and the ACK/NACK 540 has been received by the eNB 502.

The extended grant (e.g., 526) may achieve similar functionality as multiple HARQ processes. In one configuration, the eNB 502 may serve new data to the UE 504 when ACK/NACK for a previously transmitted grant is not yet received. The extended grant may not be as flexible as the multiple HARQ processes, in the sense that the extended grant may require many parameters to be the same, such as the number of resource elements per TTI, rank. In one configuration, because there is no need to have multiple HARQ processes, using the extended grant may provide some signaling saving. Using the extended grant may also avoid retransmission fragmentations. The extended grant may achieve satisfactory performance under most circumstances without incurring the cost associated with multiple HARQ processes.

Figure 6:
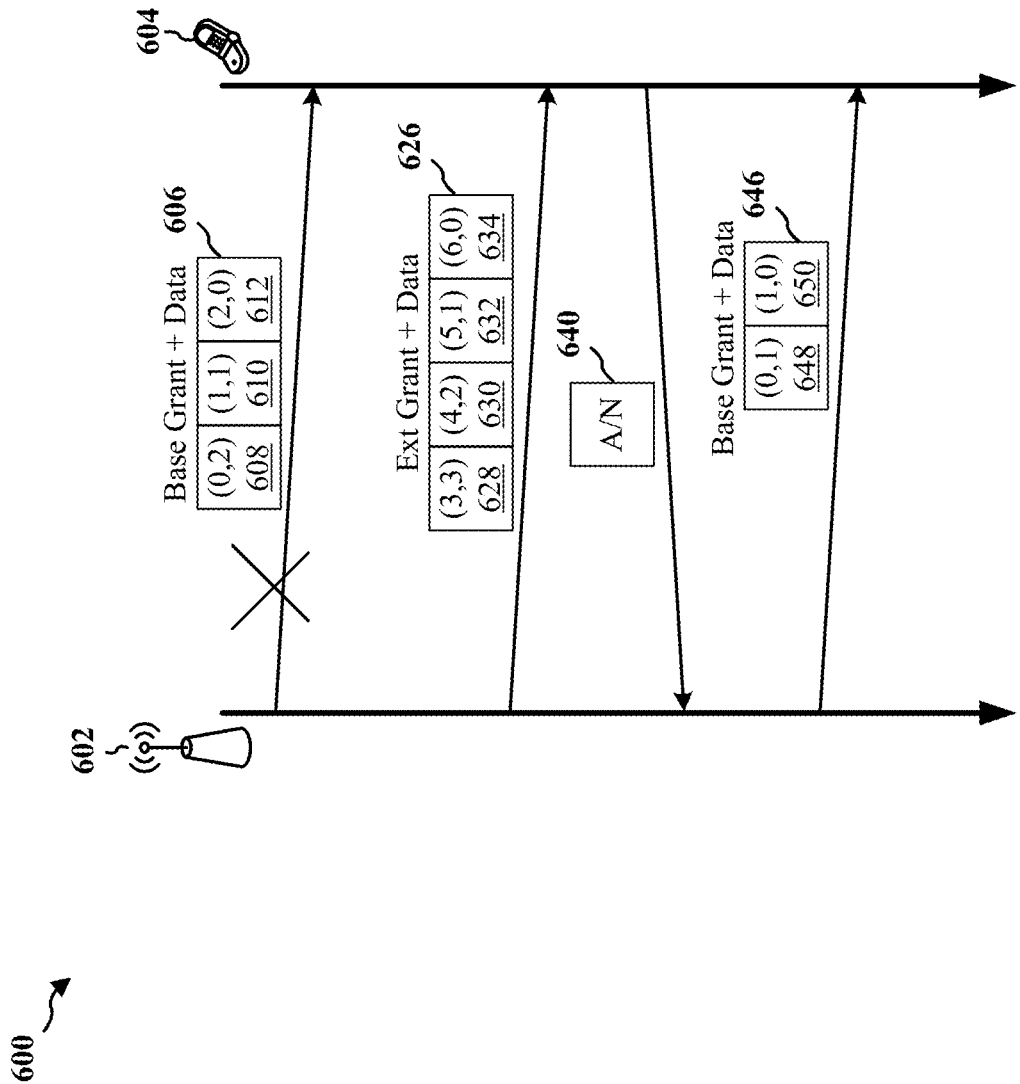
FIG. 6 is a diagram illustrating another example of using the extended grant for data transmission.

FIG. 6 is a diagram 600 illustrating another example of using the extended grant for data transmission. In this example, an eNB 602 may send a base grant 606 and corresponding data to a UE 604. The base grant 606 may have three TTIs 608, 610, and 612. The iterations of the base grant 606 in TTIs 608, 610, and 612 may contain before/after value pairs similar to those of the base grant 406 described above with reference to FIG. 4.

However, the UE 604 may fail to receive the base grant 606. Thus the UE 604 may not generate an acknowledgment to the base grant 606 and no ACK/NACK may be transmitted to the eNB 602. Because the eNB 602 does not receive an acknowledgment from the UE 604 regarding the base grant 606, the eNB 602 may schedule an extended grant 626 for the UE 604, and send the extended grant 626 and corresponding data (e.g., new data) to the UE 604. The extended grant 626 may have four TTIs 628, 630, 632, and 634. Each iteration of the extended grant 626 may include the number of TTIs in the base grant 606 in the "before" field of the grant. The iterations of the extended grant 626 in TTIs 628, 630, 632, and 634 may contain before/after value pairs similar to those of the extended grant 526 described above with reference to FIG. 5.

In the example of FIG. 6, because the acknowledgment for the base grant 606 fails to be received at the eNB 602, the extended grant 626 may be scheduled and transmitted. In one configuration, each of the base grant 606 and the extended grant 626 may contain a Mayday bit. In such a configuration, Mayday bits of the base grant 606 and the extended grant 626 may be identical. Because the grant 606 is a base grant, Mayday bit of the base grant 606 may be different (e.g., toggled) from a previous grant (not shown, referred to as grant A), which is received and acknowledged by the UE 604. Therefore, Mayday bit of the extended grant 626 may also be different from the grant A.

The UE 604 may receive the extended grant 626 after receiving and acknowledging grant A. Because Mayday bits of the grant A and the extended grant 626 are different and the before/after field of the extended grant 626 indicates a continuation from a previous grant, the UE 604 may realize that the grant 626 is an extended grant and there is a previous grant or there are previous TTIs missing. The UE 604 may treat the TTIs 608, 610, and 612 of the grant 606 as not received or not decoded, and generate an acknowledgment (e.g., ACK/NACK 640) to acknowledge both the grant 606 and the extended grant 626, and send the ACK/NACK 640 to the eNB 602. For example, the ACK/NACK 640 may contain a NACK for each CB in the TTIs 608, 610, 612 and an ACK or NACK for each CB in the TTIs 628, 630, 632, and 634.

Upon successful receipt of the ACK/NACK 640 at the eNB 602, the eNB 602 may schedule another base grant 646 for the UE 604, and send the base grant 646 and corresponding data to the UE 604. The base grant 646 may have two TTIs 648 and 650. The iterations of the base grant 646 in TTIs 648 and 650 may contain before/after value pairs similar to those of the base grant 546 described above with reference to FIG. 5.

In the example of FIG. 6, because the ACK/NACK 640 covering the base grant 606 and the extended grant 626 is successfully received at the eNB 602, a new base grant 646 may be scheduled and transmitted. In one configuration, the base grant 646 may contain a Mayday bit. In such a configuration, Mayday bits of the extended grant 626 and the base grant 646 may be different (e.g., Mayday bit of the extended grant 626 may be toggled to generate the Mayday bit of the base grant 646).

The UE 604 may receive the base grant 646. Because Mayday bits of the extended grant 626 and the base grant 646 are different and the before/after field of the base grant 646 indicates that (e.g., by starting from zero at the "before" field) the base grant 646 is not a continuation from the extended grant 626, the UE 604 may realize that the grant 646 is a new base grant and the ACK/NACK 640 has been received by the eNB 602.

When an extended grant fails to be received by an UE, the UE may not be able to know how many TTIs in total are missing, thus cannot send any ACK/NACK to the eNB. In one configuration, when an eNB fails to receive an acknowledgment for an extended grant, the eNB may send a special extended grant (e.g., an empty extended grant, also referred to as acknowledgment retransmission trigger) to the UE to trigger an ACK/NACK retransmission. In one configuration, the empty extended grant may provide how many TTIs in total that have not been acknowledged. Upon successful receipt of the empty extended grant, the UE may be able to figure out a missing extended grant if the total number of unacknowledged TTIs provided by the empty extended grant does not match what the UE receives.

Figure 7:
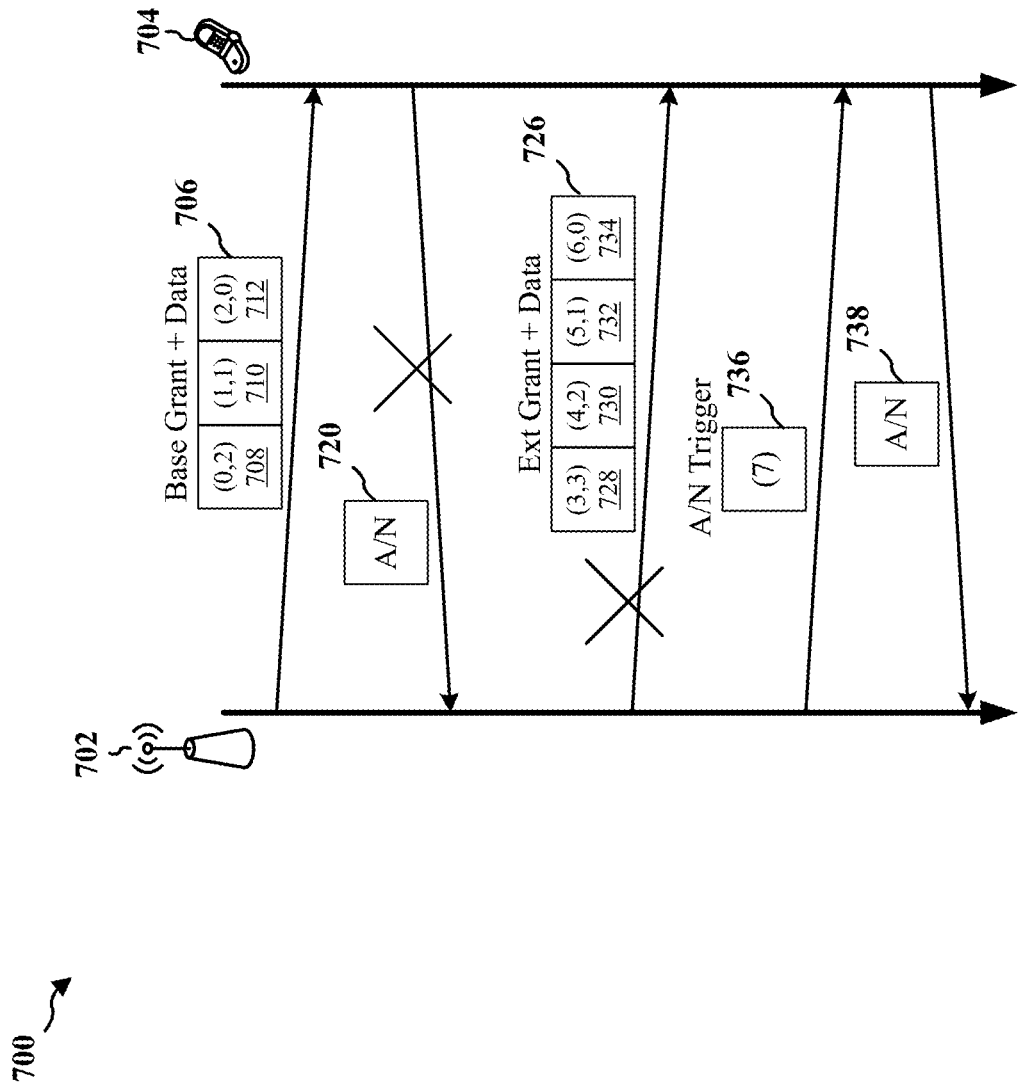
FIG. 7 is a diagram illustrating an example of using an acknowledgment retransmission trigger for data transmission.

FIG. 7 is a diagram 700 illustrating an example of using an acknowledgment retransmission trigger for data transmission. In this example, an eNB 702 may send a base grant 706 and corresponding data to a UE 704. The base grant 706 may have three TTIs 708, 710, and 712. The iterations of the base grant 706 in TTIs 708, 710, and 712 may contain before/after value pairs similar to those of the base grant 406 described above with reference to FIG. 4.

Upon successful receipt of the base grant 706 at the UE 704, the UE 704 may try to deliver an acknowledgment (e.g., ACK/NACK 720) to the eNB 702. The ACK/NACK 720 may contain an ACK or NACK for each CB in the TTIs 708, 710, and 712.

However, the eNB 702 may fail to receive the ACK/NACK 720. In one configuration, the eNB 702 may fail to receive the ACK/NACK 720 because the ACK/NACK 720 is not transmitted (e.g., due to CCA failure). In another configuration, the eNB 702 may fail to receive the ACK/NACK 720 because the ACK/NACK 720 fails to be decoded at the eNB 702 even though the ACK/NACK 720 is transmitted to the eNB 702.

Because the ACK/NACK 720 is not received, the eNB 702 may schedule an extended grant 726 for the UE 704, and send the extended grant 726 and corresponding data (e.g., new data) to the UE 704. The extended grant 726 may have four TTIs 728, 730, 732, and 734. Each iteration of the extended grant 726 may include the number of TTIs in the base grant 706 in the "before" field of the grant. The iterations of the extended grant 726 in TTIs 728, 730, 732, and 734 may contain before/after value pairs similar to those of the extended grant 526 described above with reference to FIG. 5.

In the example of FIG. 7, because the ACK/NACK 720 for the base grant 706 fails to be received at the eNB 702, the extended grant 726 may be scheduled and transmitted. In one configuration, each of the base grant 706 and the extended grant 726 may contain a Mayday bit. In such a configuration, Mayday bits of the base grant 706 and the extended grant 726 may be identical.

The extended grant 726 may get lost. Thus the UE 704 may fail to receive the extended grant 726 and may not generate an acknowledgment to the extended grant 726. Consequently, no acknowledgment to the extended grant 726 may be received by the eNB 702. Because the eNB 702 does not receive an acknowledgment from the UE 704 regarding the extended grant 726, the eNB 702 may schedule an acknowledgment retransmission trigger 736, and send the acknowledgment retransmission trigger 736 to the UE 704. The acknowledgment retransmission trigger 736 may be an empty extended grant that contains the total number of TTIs (e.g., seven in this example) that have not been acknowledged.

Upon successful receipt of the acknowledgment retransmission trigger 736 at the UE 704, the UE 704 may realize that the ACK/NACK 720 fails to be received by the eNB 702 and there is a missing extended grant 726, based on information in the received base grant 706 and the acknowledgment retransmission trigger 736. The UE 704 may generate an acknowledgment (e.g., ACK/NACK 738) to acknowledge both the base grant 706 and the extended grant 726, and sends the ACK/NACK 738 to the eNB 702. The ACK/NACK 738 may contain an ACK or NACK for each CB in the TTIs 708, 710, 712, and a NACK for each CB in the TTIs 728, 730, 732, and 734.

Figure 8:
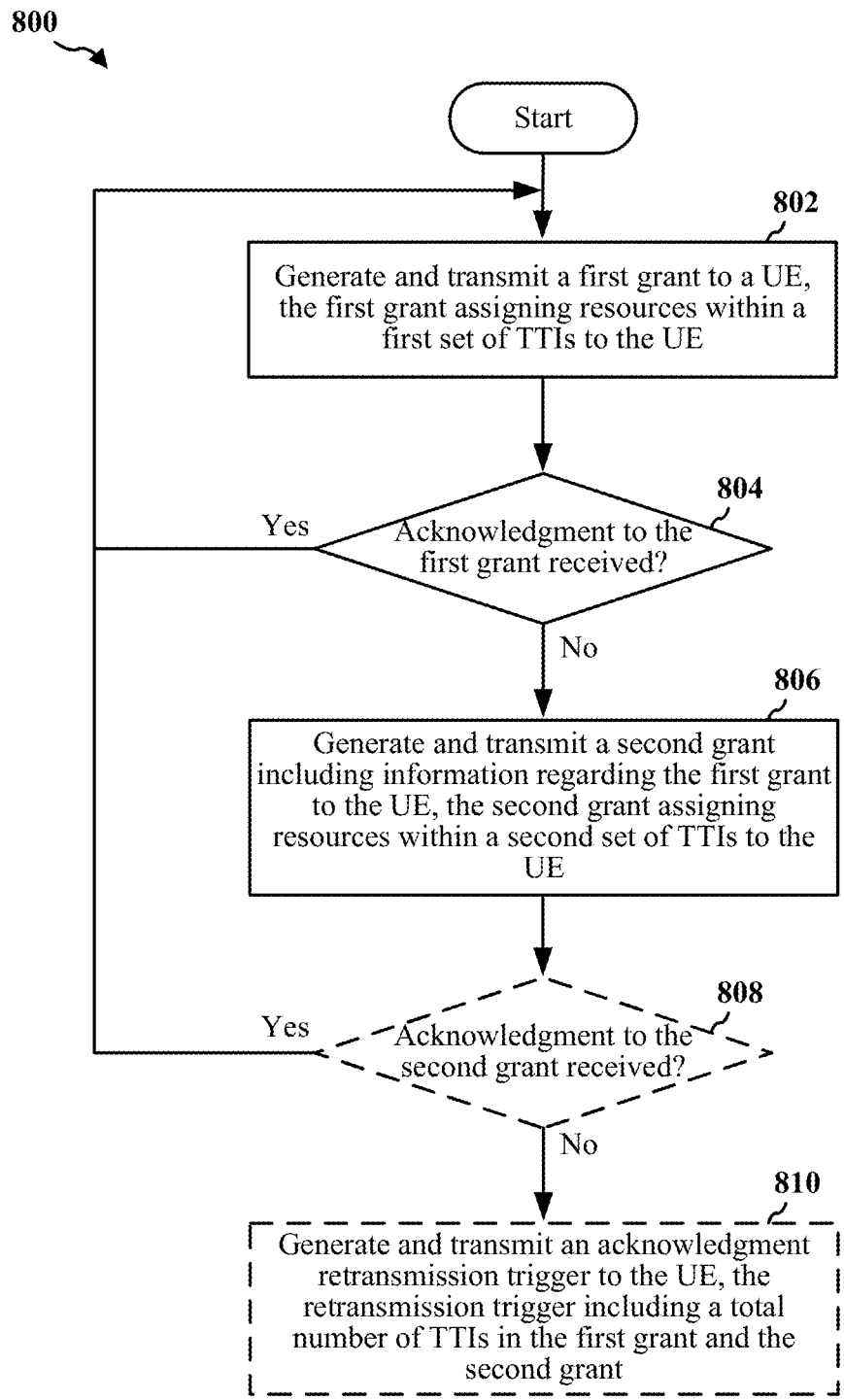
FIG. 8 is a flowchart of a method of wireless communication.

FIG. 8 is a flowchart 800 of a method of wireless communication. The method may be performed by an eNB (e.g., the eNB 102, 310, 402, 502, 602, 702, or the apparatus 1002/1002'). At 802, the eNB may generate and transmit a first grant to a UE (e.g., the UE 104, 350, 404, 504, 604, 704, or the apparatus 1202/1202'). The first grant may assign resources within a first set of TTIs to the UE. In one configuration, the first grant may be a base grant (e.g., the base grant 406, 426, 506, 546, 606, 646, or 706). In one configuration, the first grant may contain a first Mayday bit.

At 804, the eNB may determine whether an acknowledgment to the first grant is received by the eNB. In one configuration, the acknowledgment to the first grant may be an ACK/NACK (e.g., the ACK/NACK 420, 520, or 720). If the acknowledgment to the first grant is received, the eNB may loop back to 802 to transmit a new base grant. If the acknowledgment to the first grant is not received, the eNB may proceed to 806.

At 806, the eNB may generate and transmit a second grant including information regarding the first grant to the UE. The second grant may assign resources within a second set of TTIs to the UE. In one configuration, the second grant may be an extended grant (e.g., the extended grant 526, 626, or 726). In one configuration, the information regarding the first grant contained in the second grant may be the number of TTIs in the first grant.

In one configuration, the second grant may contain a second Mayday bit. In one configuration, the value of the second Mayday bit may be identical to the value of the first Mayday bit. In one configuration, the assigned resources within the first and second sets of TTIs may be time-frequency resource elements. In one configuration, each TTI of the first and second sets of TTIs may be configured by the same set of parameters, which may include the same rank, the same MCS scheme, and the same number of resource elements.

At 808, the eNB may optionally determine whether an acknowledgment to the second grant is received by the eNB. In one configuration, the acknowledgment to the second grant may be an ACK/NACK (e.g., the ACK/NACK 540 or 640). If the acknowledgment to the second grant is received, the eNB may loop back to 802 to transmit a new base grant. If the acknowledgment to the second grant is not received, the eNB may proceed to 810.

At 810, the eNB may optionally generate and transmit an acknowledgment retransmission trigger (e.g., the acknowledgment retransmission trigger 736) to the UE. The acknowledgment retransmission trigger may include the total number of TTIs that have not been acknowledged (e.g., the total number of TTIs in the first grant and the second grant).

In one configuration, for each base grant or extended grant, the nominal per TTI payload size N may be a function of MCS, rank, and the number resource elements in each TTI. In one configuration, the nominal per TTI payload size N may be retrieved from a lookup table based on the MCS, rank, and the number resource elements in each TTI. In one configuration, the nominal per TTI payload size N may be the same for all base grant and extended grant.

In one configuration, the extended grant may be used for base grant with New Data Indicator (NDI) equals to one only. In another configuration, the extended grant may be used for base grant with any NDI value. In such a configuration, the extended grant may provision two NDI field, one NDI field for itself and the other NDI field for the base grant.

In one configuration, when there is CB retransmission, a CB may not ride across different TTIs. The list and order of retransmission CBs may be known at both eNB and UE. The length of CB i to be transmitted is $L_i$. For the first TTI, the eNB may find the maximum number of retransmissions CBs $I_1$ such that $\Sigma_{i=1 \ldots I_1} L_i \leq N$. The eNB may then fill the first TTI with the first $I_1$ retransmission CBs. The eNB may then remove the first $I_1$ retransmission CBs from the list of retransmission CBs and continue the same process for the remaining retransmission CBs, until reaching a TTI that has space left after filling all the retransmission CBs.

After all the retransmission CBs are filled into the TTIs, the eNB may start to fill new CBs into the TTIs. The segmentation of transport blocks into CBs may follow legacy procedure. In one configuration, for TTIs with new CBs only, the CB segmentation may follow the legacy procedure.

In one configuration, when ACK/NACK for a grant (e.g., a base grant) is not received, the eNB may have three options: 1) put the transmission on hold and trigger an ACK/NACK retransmission; 2) abandon the previous transmission and issue a new grant (with the same Mayday bit so the UE knows the transmitted ACK/NACK was not received); or 3) use the extended grant to continue serving the UE. In one configuration, the eNB may use some side information to help selecting one of the options. For example and in one configuration, the eNB may check whether there a jammer detected at the time-frequency resource when an ACK/NACK is expected. If yes, likely an ACK/NACK is transmitted but is jammed, and using the extended grant may help. In another configuration, the eNB may check the CCA status before the ACK/NACK reception. The CCA status may have some correlation to the UE side CCA result. If the energy level is high, the ACK/NACK missing may be caused by UE failing CCA. In one configuration, the eNB may consider the UE CQI report, which may indicate the likelihood that the UE misses the grant. If the UE misses the grant, it might be better to abandon the grant to transmit a new grant. In one configuration, the eNB may combine two or more side information (e.g., two or more information described above) to decide which option to select.

Figure 9:
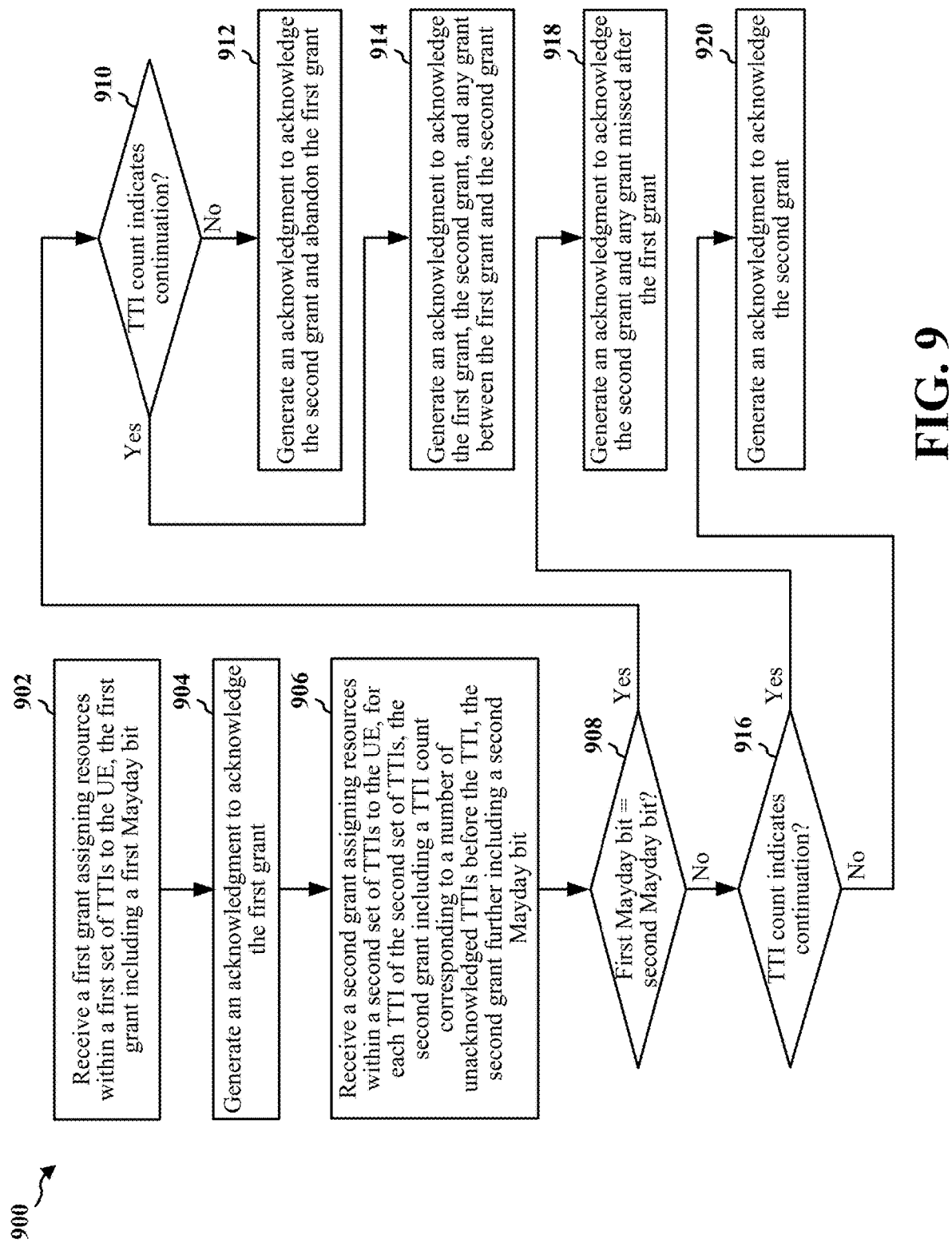
FIG. 9 is a flowchart of a method of wireless communication.

FIG. 9 is a flowchart 900 of a method of wireless communication. The method may be performed by a UE (e.g., the UE 104, 350, 404, 504, 604, 704, or the apparatus 1202/1202'). At 902, the UE may receive, from an eNB (e.g., the eNB 102, 310, 402, 502, 602, 702, or the apparatus 1002/1002'), a first grant assigning resources within a first set of TTIs to the UE. In one configuration, the first grant may be a base grant (e.g., the base grant 406, 426, 506, 546, 606, 646, or 706). In one configuration, the first grant may contain a first Mayday bit.

At 904, the UE may generate an acknowledgment to acknowledge the first grant. In one configuration, the acknowledgment to the first grant may be an ACK/NACK (e.g., the ACK/NACK 420, 520, or 720) that is to be sent to the eNB.

At 906, the UE may receive a second grant assigning resources within a second set of TTIs to the UE. In one configuration, for each TTI of the second set of TTIs, the second grant may include a TTI count corresponding to a number of unacknowledged TTIs before the TTI (e.g., in the "before" field of the second grant). In one configuration, the second grant may be an extended grant (e.g., the extended grant 526, 626, or 726). In one configuration, the second grant may contain a second Mayday bit. In one configuration, the assigned resources within the first and second sets of TTIs may be time-frequency resource elements. In one configuration, each TTI of the first and second sets of TTIs may be configured by the same set of parameters, which may include the same rank, the same MCS scheme, and the same number of resource elements per TTI.

At 908, the UE may determine an acknowledgment by determining whether the first Mayday bit contained in the first grant is identical to the second Mayday bit contained in the second grant. If the first Mayday bit and the second Mayday bit are identical, the UE may proceed to 910. If the first Mayday bit and the second Mayday bit are not identical, the UE may proceed to 916.

At 910, the UE may determine the acknowledgment by determining whether the TTI count contained in the second grant indicates a continuation from a previous grant. If the TTI count indicates continuation from a previous grant (e.g., the TTI count may start from a value that is greater than zero), the UE may proceed to 914. In one configuration, the TTI count may indicate a gap between the first grant and the second grant (e.g., the TTI count may start from a value that is greater than the total number of TTIs in the first grant). In such a configuration, there may be a missing extended grant between the first grant and the second grant. In one configuration, if the TTI count indicates continuation from a previous grant, the second grant may be an extended grant and the first grant may be a base grant, and the previous ACK/NACK transmitted may not be received at the eNB. At 914, the UE may generate the acknowledgment to acknowledge the first grant, the second grant, and any grant between the first grant and the second grant.

If the UE determines (at 910) that the TTI count does not indicate a continuation from a previous grant (e.g., the TTI count may start from zero), the eNB may have abandoned the first grant and the UE proceeds to 912. At 912, the UE may generate the acknowledgment to acknowledge the second grant and may abandon the first grant.

At 916, the UE may determine the acknowledgment by determining whether the TTI count contained in the second grant indicates a continuation from a previous grant. If the TTI count indicates continuation from a previous grant (e.g., the TTI count may start from a value that is greater than zero), the UE proceeds to 918. In one configuration, if the TTI count indicates continuation from a previous grant, either there might be TTIs before the current TTI in the same burst that the UE missed, or there might be a previous burst with missing grant. At 918, the UE may generate the acknowledgment to acknowledge the second grant and any grant missed after the first grant (e.g., a missing grant that is between the first grant and the second grant, and to which the second grant is an extension).

If the UE determines (at 916) that the TTI count does not indicate a continuation from a previous grant (e.g., the TTI count may start from zero), the second grant is a base grant and the ACK/NACK to the first grant is received by the eNB, the UE may proceed to 920. At 920, the UE may generate the acknowledgment to acknowledge the second grant. In one configuration, the acknowledgment generated at 912, 914, 918, or 920 may be transmitted to the eNB.

Figure 10:
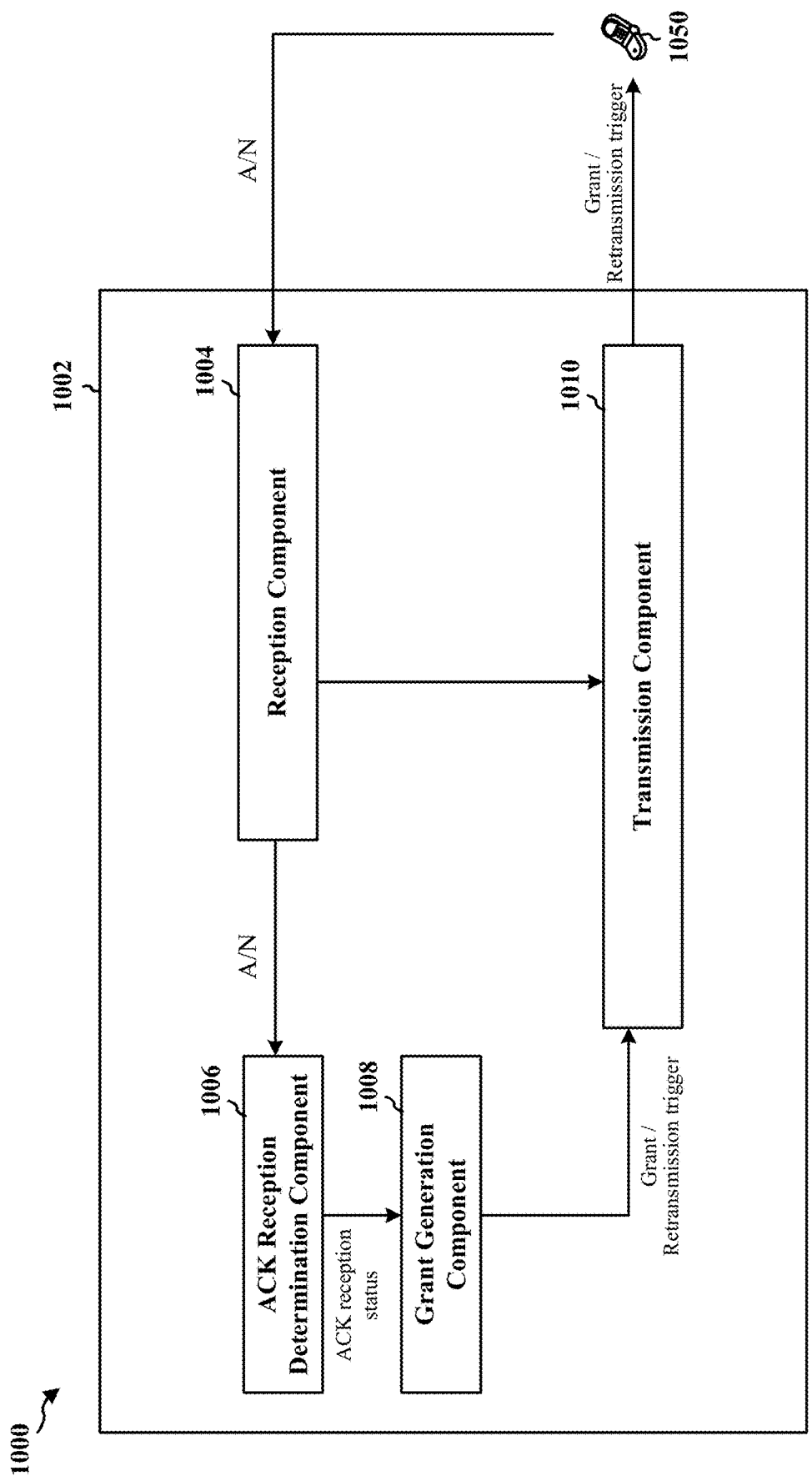
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be an eNB. The apparatus 1002 may include a reception component 1004 that receives, from a UE 1050, ACK/NACK to grant transmitted by the apparatus. The apparatus 1002 may include a transmission component 1010 that transmits grant or acknowledgment retransmission trigger to the UE 1050. In one configuration, the transmission component 1010 may perform operations described above with reference to 802, 806, or 810 of FIG. 8. The reception component 1004 and the transmission component 1010 may work together to coordinate the communications of the apparatus 1002.

In one configuration, the apparatus 1002 may include an acknowledgment reception determination component 1006 that determines whether an acknowledgment to a particular transmitted grant is received based on the acknowledgments received from the reception component 1004. In one configuration, the acknowledgment reception determination component 1006 may perform operations described above with reference to 804 or 808 of FIG. 8.

In one configuration, the apparatus 1002 may include a grant generation component 1008 that generates appropriate grant (e.g., base grant, extended grant, or acknowledgment retransmission trigger) based on the acknowledgment reception status received from the acknowledgment reception determination component 1006. In one configuration, the grant generation component 1008 may perform operations described above with reference to 802, 806, or 808 of FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
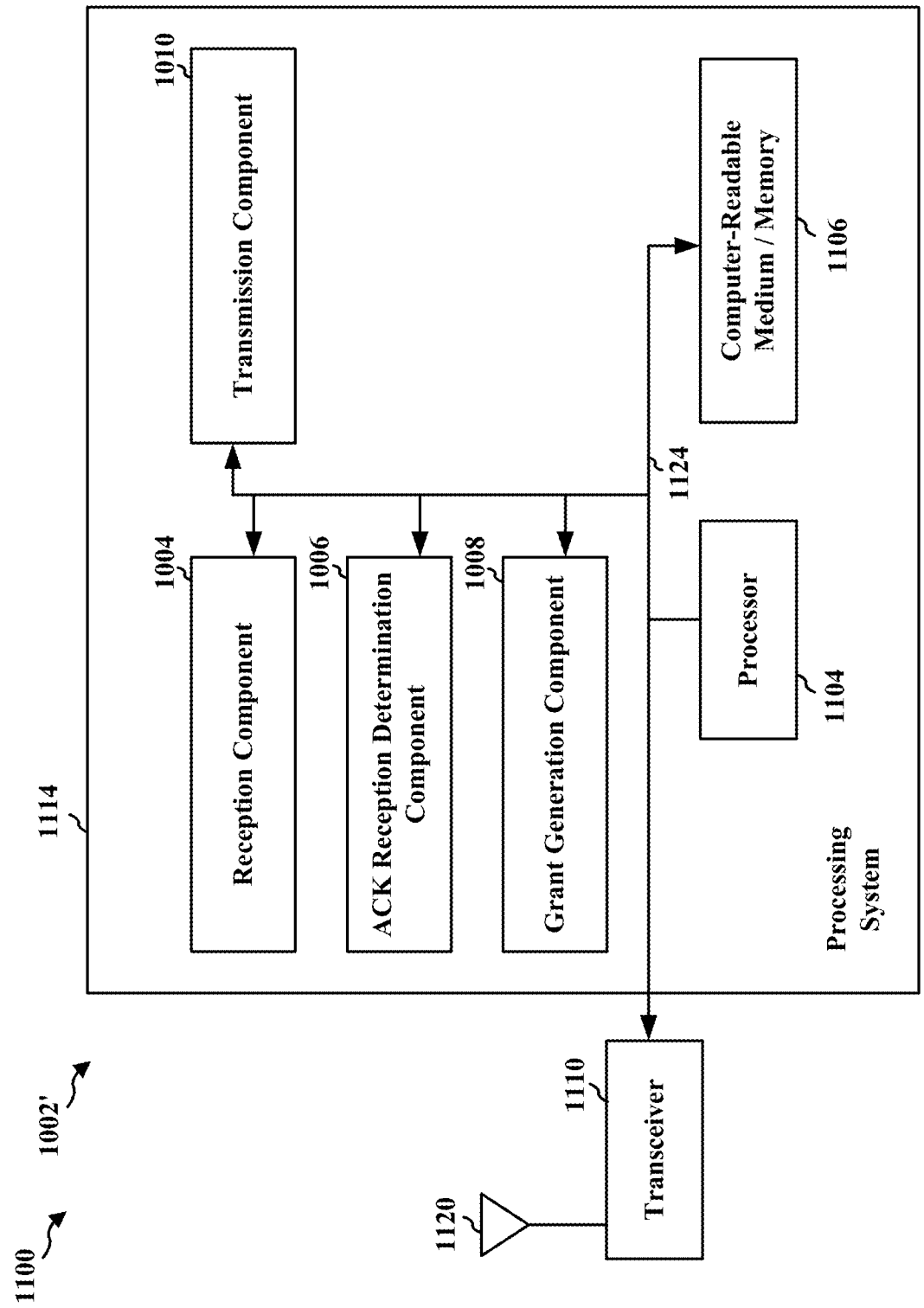
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, and 1010. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375.

In one configuration, the apparatus 1002/1002' for wireless communication may include means for transmitting a first grant to a UE. In one configuration, the means for transmitting a first grant may be the transceiver 1110, the one or more antennas 1120, the transmission component 1010, or the processor 1104. In one configuration, the means for transmitting a first grant may perform operations described above with reference to 802 of FIG. 8.

In one configuration, the apparatus 1002/1002' may include means for generating a first grant for a UE. In one configuration, the means for generating a first grant may be the grant generation component 1008 or the processor 1104. In one configuration, the means for generating a first grant may perform operations described above with reference to 802 of FIG. 8.

In one configuration, the apparatus 1002/1002' may include means for determining whether an acknowledgment to the first grant is received by the base station. In one configuration, the means for determining whether an acknowledgment to the first grant is received may be the acknowledgment reception determination component 1006 or the processor 1104. In one configuration, the means for determining whether an acknowledgment to the first grant is received may perform operations described above with reference to 804 of FIG. 8.

In one configuration, the apparatus 1002/1002' may include means for transmitting a second grant including information regarding the first grant to the UE. In one configuration, the means for transmitting a second grant may be the transceiver 1110, the one or more antennas 1120, the transmission component 1010, or the processor 1104. In one configuration, the means for transmitting a second grant may perform operations described above with reference to 806 of FIG. 8.

In one configuration, the apparatus 1002/1002' may include means for generating a second grant including information regarding the first grant for the UE. In one configuration, the means for generating a second grant may be the grant generation component 1008 or the processor 1104. In one configuration, the means for generating a second grant may perform operations described above with reference to 806 of FIG. 8.

In one configuration, the apparatus 1002/1002' may include means for determining whether an acknowledgment to the second grant is received by the base station. In one configuration, the means for determining whether an acknowledgment to the second grant is received may be the acknowledgment reception determination component 1006 or the processor 1104. In one configuration, the means for determining whether an acknowledgment to the second grant is received may perform operations described above with reference to 808 of FIG. 8.

In one configuration, the apparatus 1002/1002' may include means for transmitting an acknowledgment retransmission trigger to the UE. In one configuration, the means for transmitting an acknowledgment retransmission trigger may be the transceiver 1110, the one or more antennas 1120, the transmission component 1010, or the processor 1104. In one configuration, the means for transmitting an acknowledgment retransmission trigger may perform operations described above with reference to 810 of FIG. 8.

In one configuration, the apparatus 1002/1002' may include means for generating an acknowledgment retransmission trigger for the UE. In one configuration, the means for generating an acknowledgment retransmission trigger may be the grant generation component 1008 or the processor 1104. In one configuration, the means for generating an acknowledgment retransmission trigger may perform operations described above with reference to 810 of FIG. 8.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 12:
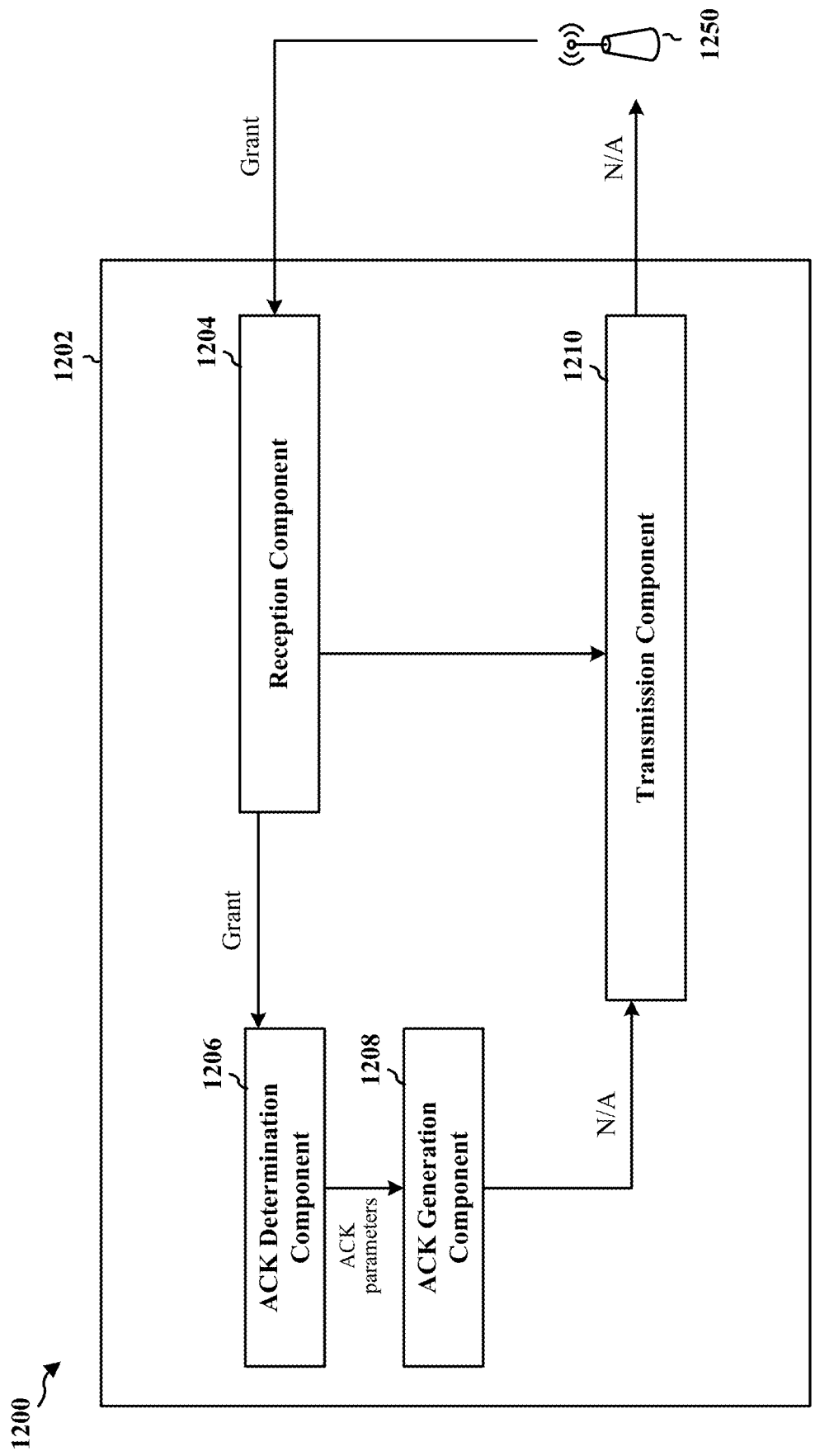
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus 1202 may be a UE. The apparatus 1202 may include a reception component 1204 that receives grant from an eNB 1250. In one configuration, the reception component 1204 may perform operations described above with reference to 902 or 906 of FIG. 9. The apparatus 1202 may include a transmission component 1210 that transmits acknowledgment to the eNB 1250. The reception component 1204 and the transmission component 1210 may work together to coordinate the communications of the apparatus 1202.

In one configuration, the apparatus 1202 may include an acknowledgment determination component 1206 that determines a set of acknowledgment parameters (e.g., whether Mayday bits of the two latest grants are identical and whether the latest grant indicates continuation from a previous grant) based on the grants received from the reception component 1204. In one configuration, the acknowledgment determination component 1206 may perform operations described above with reference to 908, 910, or 916 of FIG. 9.

In one configuration, the apparatus 1202 may include an acknowledgment generation component 1208 that generates acknowledgment based on the set of acknowledgment parameters received from the acknowledgment determination component 1206. In one configuration, the acknowledgment generation component 1208 may perform operations described above with reference to 904, 912, 914, 918, or 920 of FIG. 9.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
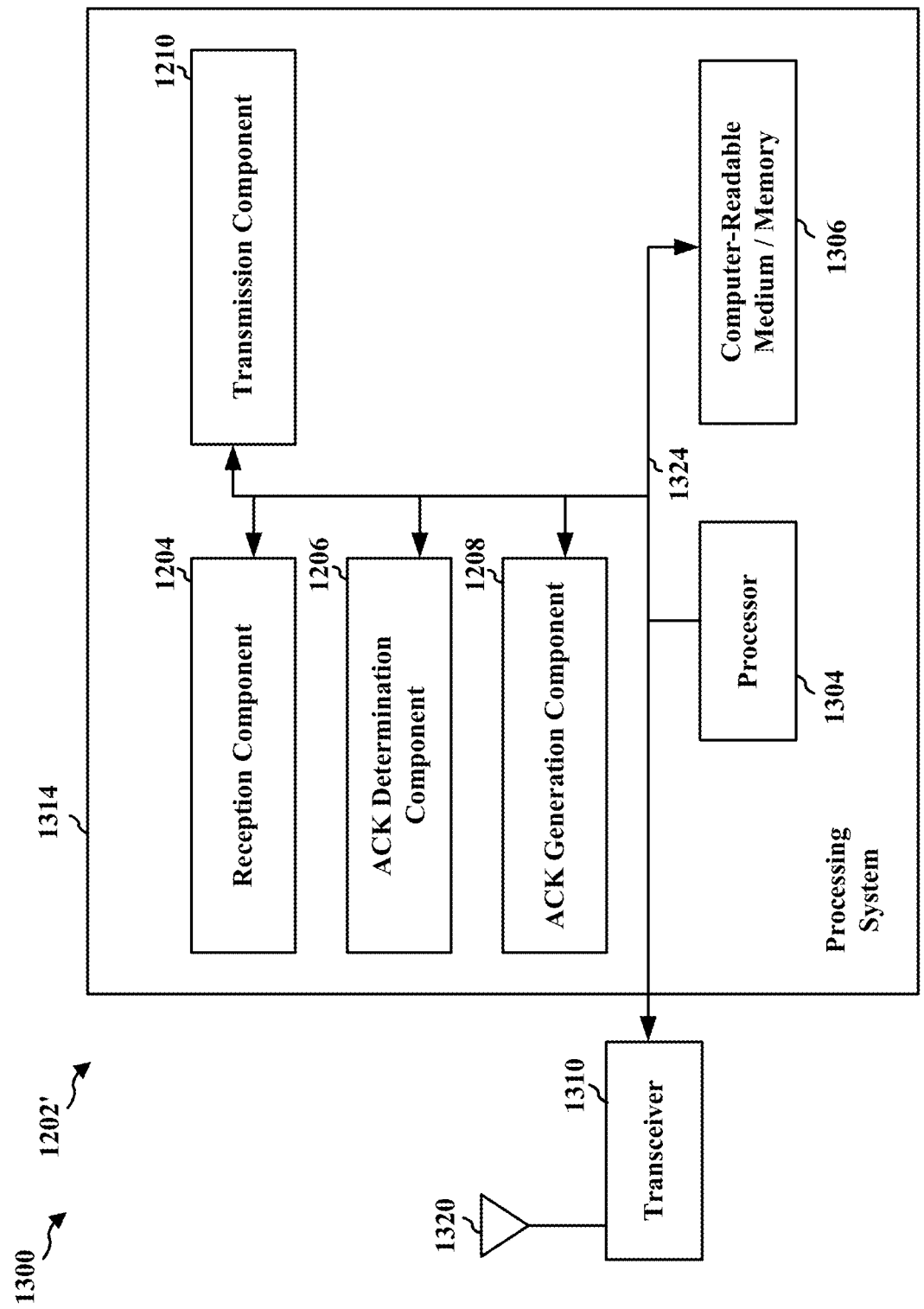
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, and 1210. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication may include means for receiving a first grant assigning resources within a first set of TTIs to the apparatus. In one configuration, the means for receiving a first grant may be the transceiver 1310, the one or more antennas 1320, the reception component 1204, or the processor 1304. In one configuration, the means for receiving a first grant may perform operations described above with reference to 902 of FIG. 9.

In one configuration, the apparatus 1202/1202' may include means for receiving a second grant assigning resources within a second set of TTIs to the apparatus. In one configuration, the means for receiving a second grant may be the transceiver 1310, the one or more antennas 1320, the reception component 1204, or the processor 1304. In one configuration, the means for receiving a second grant may perform operations described above with reference to 906 of FIG. 9.

In one configuration, the apparatus 1202/1202' may include means for determining an acknowledgment based on the TTI count and the first and second Mayday bits. In one configuration, the means for determining an acknowledgment based on the TTI count and the first and second Mayday bits may be the acknowledgment determination component 1206 or the processor 1304. In one configuration, the means for determining an acknowledgment based on the TTI count and the first and second Mayday bits may perform operations described above with reference to 908, 910, or 916 of FIG. 9.

In one configuration, the means for determining the acknowledgment may be configured to generate the acknowledgment to acknowledge the first grant, the second grant, and any grant between the first grant and the second grant when the first Mayday bit and the second Mayday bit are identical and the TTI count contained in the second grant indicates a continuation from a previous grant. In one configuration, the means for determining the acknowledgment may be configured to generate the acknowledgment to acknowledge the second grant and abandon the first grant when the first Mayday bit and the second May bit are identical and the TTI count contained in the second grant indicates that the first grant is abandoned. In one configuration, the means for determining the acknowledgment may be configured to generate the acknowledgment to acknowledge the second grant and any grant missed after the first grant when the first Mayday bit and the second Mayday bit are different and the TTI count contained in the second grant indicates a continuation from a previous grant. In one configuration, the means for determining the acknowledgment may be configured to generate the acknowledgment to acknowledge the second grant when the first Mayday bit and second Mayday bit are different and the TTI count contained in the second grant indicates that the second grant is not a continuation from any previous grant.

In one configuration, the apparatus 1202/1202' may include means for generating an acknowledgment. In one configuration, the means for generating an acknowledgment may be the acknowledgment generation component 1208 or the processor 1304. In one configuration, the means for generating an acknowledgment may perform operations described above with reference to 904, 912, 914, 918, or 920 of FIG. 9.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a base station, comprising:
    transmitting a first grant to a user equipment (UE), the first grant assigning resources within a first set of Transmission Time Intervals (TTIs) to the UE, each of the first set of TTIs comprising a first number and a second number, the first number corresponding to a number of TTIs in the first grant before the TTI and the second number corresponding to a number of TTIs in the first grant after the TTI;

determining whether an acknowledgment to the first grant is received by the base station; and transmitting a second grant including information regarding the first grant to the UE when the acknowledgment to the first grant fails to be received by the base station, the second grant assigning resources within a second set of TTIs to the UE.

2. The method of claim 1, wherein each TTI of the first and second sets of TTIs is configured by a same set of parameters, wherein the same set of parameters comprises a rank, a modulation and coding (MCS) scheme, and a number of resource elements.

3. The method of claim 1, wherein, for each TTI of the second set of TTIs, the second grant comprises a first number and a second number, the first number corresponding to a sum of a number of TTIs in the first grant and a number of TTIs in the second grant before the TTI when the acknowledgment to the first grant fails to be received by the base station, the second number corresponding to a number of TTIs in the second grant after the TTI.

4. The method of claim 3, wherein the information regarding the first grant is the number of TTIs in the first grant.

5. The method of claim 1, wherein the first grant comprises a first Mayday bit and the second grant comprises a second Mayday bit.

6. The method of claim 5, wherein a value of the second Mayday bit is identical to a value of the first Mayday bit.

7. The method of claim 1, further comprising:
determining whether an acknowledgment to the second grant is received by the base station; and
transmitting an acknowledgment retransmission trigger to the UE when the acknowledgment to the second grant fails to be received by the base station, the acknowledgment retransmission trigger comprising a total number of TTIs in the first grant and the second grant.

8. An apparatus for wireless communication, the apparatus being a base station, comprising:
a memory; and
at least one processor coupled to the memory and configured to:
transmit a first grant to a user equipment (UE), the first grant assigning resources within a first set of Transmission Time Intervals (TTIs) to the UE, each of the first set TTI's comprising a first number and a second number, the first number corresponding to a number of TTIs in the first grant before the TTI and the second number corresponding to a number of TTIs in the first grant after the TTI;
determine whether an acknowledgment to the first grant is received by the base station; and
transmit a second grant including information regarding the first grant to the UE when the acknowledgment to the first grant fails to be received by the base station, the second grant assigning resources within a second set of TTIs to the UE.

9. The apparatus of claim 8, wherein each TTI of the first and second sets of TTIs is configured by a same set of parameters, wherein the same set of parameters comprises a rank, a modulation and coding (MCS) scheme, and a number of resource elements.

10. The apparatus of claim 8, wherein, for each TTI of the second set of TTIs, the second grant comprises a first number and a second number, the first number corresponding to a sum of a number of TTIs in the first grant and a number of TTIs in the second grant before the TTI when the acknowledgment to the first grant fails to be received by the base station, the second number corresponding to a number of TTIs in the second grant after the TTI.

11. The apparatus of claim 10, wherein the information regarding the first grant is the number of TTIs in the first grant.

12. The apparatus of claim 8, wherein the first grant comprises a first Mayday bit and the second grant comprises a second Mayday bit.

13. The apparatus of claim 12, wherein a value of the second Mayday bit is identical to a value of the first Mayday bit.

14. The apparatus of claim 8, wherein the at least one processor is further configured to:
determine whether an acknowledgment to the second grant is received by the base station; and
transmit an acknowledgment retransmission trigger to the UE when the acknowledgment to the second grant fails to be received by the base station, the acknowledgment retransmission trigger comprising a total number of TTIs in the first grant and the second grant.

15. An apparatus for wireless communication, the apparatus being a base station, comprising:
means for transmitting a first grant to a user equipment (UE), the first grant assigning resources within a first set of Transmission Time Intervals (TTIs) to the UE, each of the first set of TTIs comprising a first number and a second number, the first number corresponding to a number of TTIs in the first grant before the TTI and the second number corresponding to a number of TTIs in the first grant after the TTI;
means for determining whether an acknowledgment to the first grant is received by the base station; and
means for transmitting a second grant including information regarding the first grant to the UE when the acknowledgment to the first grant fails to be received by the base station, the second grant assigning resources within a second set of TTIs to the UE.

16. The apparatus of claim 15, wherein each TTI of the first and second sets of TTIs is configured by a same set of parameters, wherein the same set of parameters comprises a rank, a modulation and coding (MCS) scheme, and a number of resource elements.

17. The apparatus of claim 15, wherein, for each TTI of the second set of TTIs, the second grant comprises a first number and a second number, the first number corresponding to a sum of a number of TTIs in the first grant and a number of TTIs in the second grant before the TTI when the acknowledgment to the first grant fails to be received by the base station, the second number corresponding to a number of TTIs in the second grant after the TTI.

18. The apparatus of claim 17, wherein the information regarding the first grant is the number of TTIs in the first grant.

19. The apparatus of claim 15, wherein the first grant comprises a first Mayday bit and the second grant comprises a second Mayday bit.

20. The apparatus of claim 19, wherein a value of the second Mayday bit is identical to a value of the first Mayday bit.

21. The apparatus of claim 15, further comprising:
means for determining whether an acknowledgment to the second grant is received by the base station; and
means for transmitting an acknowledgment retransmission trigger to the UE when the acknowledgment to the second grant fails to be received by the base station, the acknowledgment retransmission trigger comprising a total number of TTIs in the first grant and the second grant.

22. A non-transitory computer-readable medium of a base station storing computer executable code, comprising code for:
transmitting a first grant to a user equipment (UE), the first grant assigning resources within a first set of Transmission Time Intervals (TTIs) to the UE, each of the first set of TTIs comprising a first number and a second number, the first number corresponding to a number of TTIs in the first grant before the TTI and the second number corresponding to a number of TTIs in the first grant after the TTI;
determining whether an acknowledgment to the first grant is received by the base station; and
transmitting a second grant including information regarding the first grant to the UE when the acknowledgment to the first grant fails to be received by the base station, the second grant assigning resources within a second set of TTIs to the UE.

23. The non-transitory computer-readable medium of claim 22, wherein each TTI of the first and second sets of TTIs is configured by a same set of parameters, wherein the same set of parameters comprises a rank, a modulation and coding (MCS) scheme, and a number of resource elements.

24. The non-transitory computer-readable medium of claim 22, wherein, for each TTI of the second set of TTIs, the second grant comprises a first number and a second number, the first number corresponding to a sum of a number of TTIs in the first grant and a number of TTIs in the second grant before the TTI when the acknowledgment to the first grant fails to be received by the base station, the second number corresponding to a number of TTIs in the second grant after the TTI.

25. The non-transitory computer-readable medium of claim 24, wherein the information regarding the first grant is the number of TTIs in the first grant.

26. The non-transitory computer-readable medium of claim 22, wherein the first grant comprises a first Mayday bit and the second grant comprises a second Mayday bit.

27. The non-transitory computer-readable medium of claim 26, wherein a value of the second Mayday bit is identical to a value of the first Mayday bit.

28. The non-transitory computer-readable medium of claim 22, further comprising code for:
determining whether an acknowledgment to the second grant is received by the base station; and
transmitting an acknowledgment retransmission trigger to the UE when the acknowledgment to the second grant fails to be received by the base station, the acknowledgment retransmission trigger comprising a total number of TTIs in the first grant and the second grant.

* * * * *